(12) United States Patent
Berengoltz et al.

(10) Patent No.: US 9,721,090 B2
(45) Date of Patent: Aug. 1, 2017

(54) SYSTEM AND METHOD FOR EFFICIENT INSPECTION OF CONTENT

(75) Inventors: Pavel Berengoltz, Petah-Tikva (IL); Leonid Dorrendorf, Maale Adumim (IL); Adam Carmi, Petah Tiqwa (IL); Ofer Diamant, Gimzo (IL)

(73) Assignee: Safend Ltd., Tel Aviv (IL)

( * ) Notice: Subject to any disclaimer, the term of this patent is extended or adjusted under 35 U.S.C. 154(b) by 0 days.

(21) Appl. No.: 13/695,123

(22) PCT Filed: Apr. 27, 2011

(86) PCT No.: PCT/IL2011/000335
§ 371 (c)(1),
(2), (4) Date: Oct. 29, 2012

(87) PCT Pub. No.: WO2011/135567
PCT Pub. Date: Nov. 3, 2011

(65) Prior Publication Data
US 2013/0061284 A1 Mar. 7, 2013

Related U.S. Application Data

(60) Provisional application No. 61/329,452, filed on Apr. 29, 2010.

(51) Int. Cl.
*G06F 17/00* (2006.01)
*G06F 21/51* (2013.01)
(Continued)

(52) U.S. Cl.
CPC .............. *G06F 21/51* (2013.01); *G06F 21/55* (2013.01); *G06F 21/56* (2013.01); *G06F 2221/2125* (2013.01)

(58) Field of Classification Search
CPC ......... G06F 2221/2141; G06F 21/6218; G06F 21/6227
(Continued)

(56) References Cited

U.S. PATENT DOCUMENTS 7,188,367 B1 3/2007 Edwards et al.
7,614,082 B2 * 11/2009 Adams .................. H04L 63/105
726/18

(Continued)

FOREIGN PATENT DOCUMENTS

EP 1655682 5/2006

OTHER PUBLICATIONS

International Search Report, mailed Oct. 3, 2011 for PCT International Application PCT/IL2011/000335.

(Continued)

*Primary Examiner* — Kambiz Zand
*Assistant Examiner* — Abiy Getachew
(74) *Attorney, Agent, or Firm* — Eitan, Mehulal & Sadot

(57) ABSTRACT

A system and method of efficiently inspecting content is provided. Embodiments of the invention may inspect files accessed by an application prior to an activation of the application. Selective inspection of files accessed by an application may be based on a previous inspection. Inspection of files accessed by an application may be postponed or performed concurrently with the access. A prioritized queue may include references to files, a priority may be related to a risk level and an inspection order may be according to a risk level.

20 Claims, 3 Drawing Sheets

(51) Int. Cl.
*G06F 21/55* (2013.01)
*G06F 21/56* (2013.01)

(58) Field of Classification Search
USPC .................................................. 726/1, 22
See application file for complete search history.

(56) References Cited

U.S. PATENT DOCUMENTS

| | | | |
|---|---|---|---|
| 8,112,814 B2* | 2/2012 | Shimizu | 726/27 |
| 2005/0144297 A1* | 6/2005 | Dahlstrom et al. | 709/229 |
| 2006/0107327 A1* | 5/2006 | Sprigg | G06F 21/10 726/26 |
| 2006/0168660 A1 | 7/2006 | Edwards et al. | |
| 2007/0099609 A1 | 5/2007 | Cai | |
| 2008/0172719 A1* | 7/2008 | Zhang | G06F 21/10 726/1 |
| 2009/0210721 A1* | 8/2009 | Phillips | 713/182 |
| 2011/0035783 A1* | 2/2011 | Terasaki et al. | 726/1 |
| 2012/0017000 A1* | 1/2012 | Lim | 709/229 |

OTHER PUBLICATIONS

European Search Report of European Application No. EP 11,77,4532 mailed Jun. 24, 2014.

* cited by examiner

SYSTEM AND METHOD FOR EFFICIENT INSPECTION OF CONTENT

CROSS-REFERENCE TO RELATED APPLICATIONS

This application is a National Phase Application of PCT International Patent Application No. PCT/IL2011/000335, International Filing Date Apr. 27, 2011, entitled "SYSTEM AND METHOD FOR EFFICIENT INSPECTION OF CONTENT", published on Nov. 3, 2011, as International Patent Application Publication No. WO 2011/135567, which claims priority from U.S. Provisional Patent Application No. 61/329,452, filed Apr. 29, 2010, both of which are incorporated herein by reference in their entireties.

BACKGROUND OF THE INVENTION

A large and increasing portion of the information handled in the modern office environment is digital. Many organizations, institutions, and establishments store, handle and manipulate most of their information, and/or information associated with their activities, in one or more digital forms. In many cases, such information may include confidential, secret or otherwise sensitive information, which, in the wrong hands, may cause serious damage to the owner or keeper of the information and/or to those associated with the owner or keeper of the information. Organizations subject to risk of sensitive information being provided to unauthorized, possibly hostile entities, include commercial companies, government agencies, academic institutions and/or health care facilities.

An application may distribute, publish or disseminate information in files or other content or data accessed or loaded by the application, a data leakage prevention (DLP) system may be required to inspect content or data accessed or loaded by applications, in order to prevent sensitive information leakage. A DLP system may detect attempts or requests to access content or data and enforce access policies. For example, an application may be allowed or denied access to a file, or the file may be inspected prior to enabling an application to access the file. With respect to content inspection, upon detecting an attempt made by an application to access content, a DLP system inspects the content and based on the result of the inspection, allows or denies access.

However, inspection of content may typically cause a burst of computation and input/output (I/O) operations that may translate to poor responsiveness of an application, extended load or startup time, and/or a general degradation in performance. Further aggravating the problem may be the typical case where an application may access many files or other content objects during a startup phase, while a user is waiting for the application to commence normal operation, e.g., respond to input or perform expected tasks.

Furthermore, as typical, loading of files by an application may be sequential or serial, wherein such sequential access combined with the inspection of loaded files by a DLP system may require extended time periods. Accordingly, applications may require extended periods of time before they are ready to commence normal, expected operation. Although possibly to a lesser degree, the problems described above may also be present during normal operation of an application or program, namely, whenever an application is required to load or access files.

There is a need in the art for a system and/or method to enable efficient and secured application data access control, either during application startup or during normal operation of an application.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Figure 1:
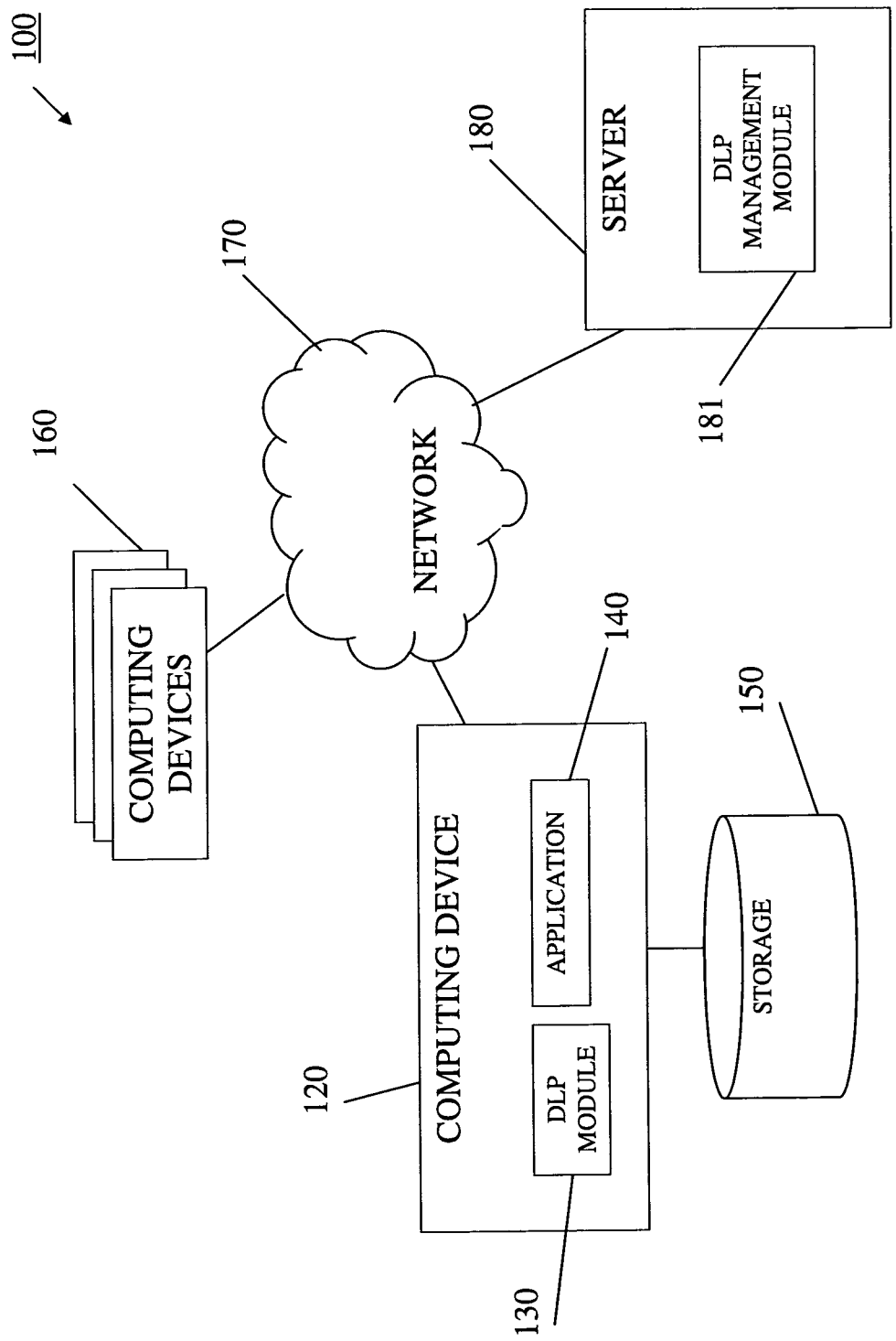
FIG. 1 is a schematic block diagram of a system according to embodiments of the invention.
Figure 3:
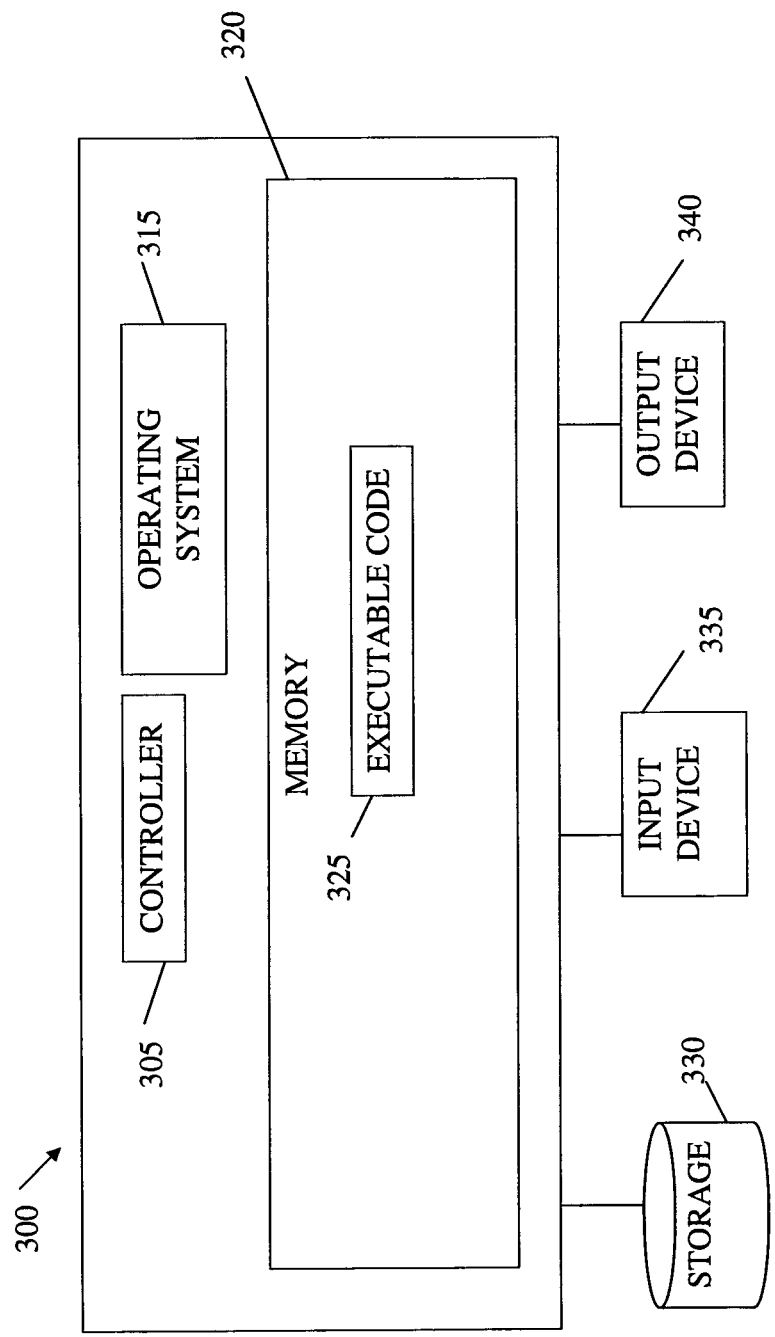
FIG. 3 is an exemplary computing device according to embodiments of the invention.

Reference is made to FIG. 1, showing a schematic view of an exemplary system 100 according to embodiments of the invention. System 100 may include a server 180, computing device 120, a plurality of computing devices 160, and a network 170 for communication therebetween. As shown, system 100 may include a data leakage prevention (DLP) module 130 that may be installed on computing device 120. As further shown, system 100 may include a data leakage prevention (DLP) management module 181 that may be installed on sever 180. In other embodiments, modules 130 and 181 or a similar modules or units may be installed on other computing devices, accordingly, it will be understood that an implementation where modules 130 and 181 are installed as shown is one of a number of possible configurations. System 100 may include an application 140 installed on computing device 120. System 100 may include a storage 150 operatively connected to computing device 120. Storage 150 may be any applicable storage device or system, e.g., a hard disk, a removable storage device such as a compact disk (CD) or a universal serial bus (USB) device or any other suitable storage device. Storage 150 may store content or data, e.g., files, that may be accessible to application 140. Computing devices 160 may be similar to computing device 120 and may include a DLP module 130, an application 140 and may be connected to a storage device or system such as storage 150. These components are not shown for the sake of simplicity and clarity. Accordingly, reference may be made herein to a plurality of modules 130 or applications 140. Application 140 may be any application, e.g., an e-mail application, an instant messaging application, a word processing application, a web browsing application or any application, program, script or part thereof that may execute or run on a computing device. Computing devices 120 and 160 and server 180 may be any suitable computing devices, for example, a personal computer, a desktop computer, a mobile computer, a laptop computer, a notebook computer, a terminal, a workstation, a server computer, a personal digital assistant (PDA) device, a tablet computer, a smartphone, or any other suitable computing device. For example, computing devices 120 and 160 and server 180 may be a computing device similar to computing device 300 as shown in FIG. 3. It will be recognized that embodiments of the invention are not limited by the type or nature of server 180 and/or computing devices 120 and 160.

Network 170 may be, may comprise or may be part of a private interne protocol (IP) network, the interne, a public or private data network, a local area network (LAN), a wireline or wireless network, an enterprise intranet, any combination of the preceding and/or any other suitable communication means. It will be recognized that embodiments of the invention are not limited by the nature or type of network 170. Although for the sake of simplicity, a single application 140 is shown, it will be understood that any number of applications may be installed and executed on devices 120 and 160 and that operations or other aspects described herein, e.g., with respect to DLP module 130, may be applicable to any number of applications.

According to embodiments of the invention, DLP module 130 may monitor, get, intercept, receive or obtain any information related to interactions with storage 150. For example, requests or attempts made by, or on behalf of, an application to access content or other information on storage 150 may be intercepted by module 130. Any content, data information or parameters being delivered from storage 150 to an application may obtained by DLP module 130. For example, a file on storage 150 being read by an application may be obtained by module 130 prior to being delivered to the application. As described herein, the file may be inspected and delivery of the file to the application may be contingent on a result of an inspection, a policy, a context, a mode of operation, a combination thereof or any applicable parameters. Any suitable means, designs, modules or units may be used in order to enable module 130 to control access to content stored on storage 150. For example, a special module in, or associated with, an operating system may inform module 130 of any attempt to access data on storage 150 and may further enable module 130 to obtain accessed data. For example, module 130 may subscribe, e.g., with an operating system, to receive indications related to an attempted access to storage 150 etc. In some embodiments, DLP module 130 may be, may comprise or may be associated with a kernel level module or an intermediate driver configured to detect, receive, monitor, intercept or otherwise obtain requests made to a file system related to storage 150 and may further determine an action that may be performed in relation to a request to access data, content or other information on storage 150. DLP Module 130 may obtain any information or data extracted from storage 150. For example, module 130 may obtain the content of a file requested by an application prior to such content being delivered to the requesting application. DLP module 130 may perform any action before, while or after obtaining data. For example in a particular embodiment, module 130 may inspect the obtained content and may enable or prevent delivery of the content to the requesting application based on the inspection.

It will be recognized that although a file system may be mostly referred to herein, such reference is made as an example of a particular case. Other structures or systems, e.g., on storage 150 or other storage systems may be similarly applicable. Accordingly, instead of or in addition to modules such as an intermediate driver and/or a kernel level module referred to herein, other modules or units may be used. For example, in cases where storage devices other than a disk drive containing a file system are used, e.g., if storage 150 is a tape drive or a network storage device and data on such storage devices or systems is not organized in a file system, then a different intermediate driver or other unit may be used. As will be understood to a person having ordinary skill in the art, such different units or modules may be properly configured and may implement any functionalities described herein, e.g., with respect to DLP module 130.

According to embodiments of the invention, DLP module 130 may receive or obtain any data or information stored on storage 150. DLP module 130 may receive or obtain any data or information communicated and/or received by storage 150. For example, upon detecting a read request related to a file stored on storage 150, module 130 may block such request, may obtain the file, e.g., by intercepting read requests from application 140 and/or by executing its own read request, and may inspect the file prior to enabling the requesting entity to access the file. In other embodiments, if in response to a read request, the requested content is placed in a buffer, module 130 may inspect data in such buffer before allowing or enabling the requesting application to access such buffer. Any implementation enabling module 130 to inspect data prior to enabling or allowing a requesting application to access or consume the data may be used. In some embodiments, inspection of content, data or other information on storage 150 may be performed unrelated to an access attempt. For example, content stored on storage 150 may be inspected by module 130 periodically or by another application or service, e.g., as a background process or based on other rules or criteria. For example, module 130 may inspect files according to a list received from a management unit, according to a predefined algorithm or upon detecting a specific file has been modified or created.

Inspection of content, data or information may comprise inspecting the content or data itself as well as inspecting any related parameters. For example, a file's modification time and/or date, a security policy, a user or application permission levels or any other related information may all be inspected, observed and/or recorded as part of inspecting content, data or information as referred to herein. Inspection of content may comprise determining whether sensitive information is included in the inspected content. For example, word spotting or otherwise searching for specific topics, terms or phrases may be used in order to determine whether the inspected content includes sensitive information and/or may be delivered to the entity requesting the content. Other or additional content inspection methods may comprise comparing or otherwise relating inspected content with fingerprinted and/or previously inspected content. For example and as known in the art, a fingerprint of confidential or sensitive data or content may be recorded and may later be used in order to determine if the data or content was modified. Yet other methods that may be employed by embodiments of the invention may comprise an examination of operations performed on a file or content. For example, any read, modify and/or write operation related to a specific content object or folder may be recorded, such recorded information may further be used as input to an inspection process described herein, e.g., in order to determine whether the content object or folder was accessed or modified.

For example, upon detecting that an application attempts to read a file, module 130 may inspect the file as described herein and determine if the file or some of the content in such file may be delivered to the application. Any action may be performed, or caused to be performed based on an inspection and/or related rules, policy, criteria or configuration. For example, based on an inspection or configuration, module 130 may block or prevent an application from accessing a file or may enable such access. Module 130 may perform additional operations, e.g., as dictated by a policy, such as recording a log of various operations, generating and/or sending an alert, notifying a user, notifying DLP Management Module 181, etc. For example, based on an inspection of content for which an attempted access is detected, and/or based on related rules, policy or other criteria, module 130 may prompt a user (e.g., using a pop-up window) to select a desired operation or action, possibly providing an explanation or possible consequences related to each of the possible actions or operations. In other embodiments or circumstances, a rule may dictate that a file or other content object will be quarantined, e.g., until an administrator allows and/or enables a specific operation related to the quarantined content.

In some embodiments, module 130, a thread of module 130 or another application may detect periods suitable for a background inspection operation to be performed and may perform inspection of content on storage 150 in the background, possibly periodically or continuously. For example, module 130 may be configured to perform background inspection of files during predefined hours, e.g., late night till early mornings. Module 130 may be configured to perform background inspection during times when the relevant computing device is relatively idle, e.g., by monitoring a level of activity of a central processing unit (CPU), a level of activity of, or input from a user or by detecting an activation of a specific application, e.g., a screen saver application. Accordingly, module 130 may defer in time any action or operation such that load, capacity or security considerations may be observed and implemented.

Module 130 may perform any action, or cause any action to be performed based on an inspection of content. In an exemplary embodiment, an action may be or may comprise a prevention of access to a content object or part of a content object. Another exemplary action may be a granting of access to a content object and possibly delivering the content object or enabling or causing such delivery. Other actions may include modifying a content object, attributes of a content object or modification or other manipulation of related parameters. For example, content may be modified or metadata related to a file, e.g., permissions or other attributes may be modified. As described herein, actions may be performed based on an inspection of content or they may be based on other parameters, context or aspects. For example, possibly in addition to being based on a result of an inspection, an action may be based on a policy, a configuration parameter. Additionally or alternatively, actions may be performed according to a mode of operation; for example, according to a background, permissive or restrictive mode of operation as described herein. Actions performed by module 130 may comprise any processing of obtained content. For example, content of a file may be processed, modified or otherwise manipulated possibly with relation to an inspection. Module 130 may perform other actions as defined or dictated by a policy, such as changing application permissions, halting or suspending an application, notifying a user, notifying DLP management module 181, etc.

According to embodiments of the invention, DLP module 130 may be operatively connected to a management unit, application or module. For example, DLP management module 181 may manage, interact with, or be otherwise associated with a plurality of DLP modules 130 installed on computing devices 120 and 160. Any suitable means may be used to enable a plurality of modules 130 to communicate with DLP management module 181. For example, inter process communication (IPC) techniques known in the art may be used or network connections, e.g., secured transmission control protocol (TCP) connections or user datagram protocol (UDP). In other embodiments, hypertext transfer protocol (HTTP) and/or secured hypertext transfer protocol (HTTPS) may be utilized to facilitate communication between a number of modules 130 and a management module such as module 181. In yet other embodiments, information, parameters or data may be transferred between modules 130 and management module 181 by means other than communication networks. For example, a physical media may be used to transfer data in files between modules 130 and management module 181. For example, policy files generated or maintained by management DLP module 181 may be copied onto a disk-on-key and thus transferred to module 130 by an operator.

According to embodiments of the invention, management module 181 may collect, manipulate, maintain, generate and distribute any information, parameters or other data that may be relevant to an efficient inspection of content as described herein. For example, lists, configuration information and parameters may be compiled and/or generated by module 181 and may be provided to a plurality of DLP modules 130. Data maintained and distributed by module 181 may comprise lists indicating specific files or sets of files, specific applications and/or policies, rules, criteria or various inspection modes that may be used and/or applied by any number of modules 130. Policies may be enforced by DLP management module 181 by distributing related information to a number of modules 130 that may act as the actual enforcing entities of such policies as described herein. Various algorithms may be implemented by management module 181 in order to compile lists and/or configuration data as described herein. Alternatively, configuration data or parameters may be specified explicitly by a human operator.

DLP management module 181 or another unit may classify or categorize applications. For example, by collecting information that may be reported by a number of modules 130, module 181 may categorize applications as trusted, untrusted, or controlled. Trusted applications may be applications that can not cause data leakage because they are not related to sensitive data, or have no output channels through which sensitive information may be leaked or disseminated. For example, an application on device 120 that never reads data from storage 150 may be classified as trusted. In some embodiments, trusted applications may be allowed access to sensitive information, possibly without inspecting accessed information prior to enabling such access.

Controlled applications may be capable of distributing, communicating or otherwise disseminating sensitive information but may further be instrumented, modified, configured or associated with other applications, modules, plug-ins, add-ins, and configurations such that communication of sensitive information by such applications is controlled. In some embodiments, provided proper means are in place, e.g., means to control, intercept and/or prevent actions leading to leakage of sensitive information, controlled applications may be allowed access to sensitive information. For example and as known in the art, an electronic mail (e-mail) application may be fitted or otherwise associated with plug-ins that may inspect outgoing mail and prevent sensitive information from being distributed over a mailing system. By classifying and/or categorizing an application as trusted or controlled, embodiments of the invention may relax the security aspects. For example, inspection of a file may be skipped when a trusted application accesses the file. In some embodiments, a trusted or controlled application may be enabled to access files without first inspecting such files.

Untrusted applications may disseminate, circulate, publicize, propagate, share or otherwise cause leakage of sensitive information. Unlike controlled applications, untrusted applications may not be prevented from leaking information, accordingly, in order to secure sensitive information, an access to information made by untrusted applications needs to be supervised or otherwise controlled. Exemplary untrusted applications may be some instant messaging clients and some web browsers which may access information on a local storage device and communicate such information, e.g., over the interne. Non-interactive software may disseminate data as well and may be classified as untrusted, for example, a system component, a user-installed service, or a hostile element such as a virus or a trojan may all be regarded, and possibly classified as untrusted.

In some embodiments, a classification may be dynamic, e.g., based on files accessed, performed operations or any relevant parameters, an application classified as trusted may be classified as untrusted or an application previously classified as untrusted, modified by fitting it with a plug-in may subsequently be classified as controlled.

Current DLP systems are required to inspect any content accessed by applications. Current DLP systems inspect files upon detecting access to the files. The drawbacks of such mode of operation, e.g., an extended period of time that may be required before an application is responsive to a user are described herein and are known in the art. As described herein, classifying applications as untrusted, trusted and control enables embodiments of the application to produce an advantage over prior art system as inspection may be omitted in some cases and consequently, performance may be improved and drawbacks of current systems described herein may be mitigated.

Some embodiments of the invention may generally operate according to two modes of operation referred to herein as a restrictive mode and a permissive mode. A restrictive mode of operation may generally provide or enable full security while optimizing content inspection time. A restrictive mode may generally be associated with delays due to inspection that may be higher than the delays yielded by the permissive mode. It will be understood that the terms "restrictive" and "permissive" as referred to herein are descriptive terms used for clarification of embodiments of the invention and are not to be construed as limiting. Operations, methods, steps or other aspects described herein in association with the restrictive mode may be applicable to the permissive mode and vice versa. Likewise, operations, methods, steps or other aspects described herein in may not necessarily be associated with any particular or specific mode of operation.

In some embodiments, the permissive mode of operation may be faster than the restrictive mode of operation. The permissive mode may be related to various assumptions and/or heuristics. The permissive mode may be related to empirical, experimental or pragmatic parameters or aspects. For example, a calculated small time window in which data leakage may theoretically occur may be allowed. For example, the permissive mode may be based on an assumption that an application will not read and disseminate sensitive data by itself, but only when instructed by the user to do so. Another assumption may be that an application will not disseminate information during a startup phase when files are being loaded by the application. Any knowledge related to an operation of a specific application or a set of applications may be used by embodiments of the invention, in particular, when operating in the permissive mode.

Below is a general, non limiting description of the restrictive mode according to embodiments of the invention. For the sake of simplicity, files will be referred to herein, however, it will be understood that any content object accessed by an application as described herein may be applicable. The restrictive mode may comprise a phase during which files loaded by an application are identified, listed or recorded. For example, information or data related to an application installed on computers in an organization may include a list of files the application accesses, e.g., during startup or during other operations, times or configurations. Alternatively or additionally, either periodically or at the first time an execution of an unknown application is detected, some or all files accessed by the application may be inspected. In addition, a list of all accessed files may be compiled. In some embodiments, a list of files accessed or loaded by an application may be sent to a central management module or server.

For example, DLP module 130 may monitor or detect any activation or invocation of an application on device 120. DLP module 130 may further maintain a list of all applications previously executed on device 120. If application 140 is a new application installed on device 120 then upon the first time application 140 is executed, DLP module 130 may identify it as a new application and may inspect all files accessed by application 140. In another scenario, if DLP module 130 was installed, updated or reconfigured after application 140 was executed on device 120 then application 140 may still be treated as an unknown or new application and accessed files may be inspected and listed or recorded as described herein. As described herein, DLP module 130 may perform the inspection according to any parameters or policy, typically provided to DLP module 130 by management module 181. DLP module 130 may report to management module 181. For example, a report may include an application identifier, e.g., the name of application 140 and any information related to files or other data accessed by application 140. For example, names of accessed files, storage location or path, a generated cryptographic hash of files' content, attributes or any other parameters related to files accessed by application 140 during a first run or a subsequent rub or execution as described herein may be recorded and/or reported to DLP management module 181.

Management module 181, a central server or another suitable entity may receive reports as described herein from a plurality of DLP modules such as DLP module 130. Management module 181 may use any algorithms or methods to process reports received as described, possibly in conjunction with other information or parameters, e.g., policies. For example, DLP management module 181 may apply a learning algorithm to a list of files provided by a plurality of modules 130 as described herein. For example, provided with a number of lists of files accessed by a specific application, DLP management module 181 may use a majority function such lists, and may further select to insert files that appear in the majority of lists into a list or group of files associated with the specific application. Accordingly, a list of files associated with a specific application may be compiled and distributed to a plurality of DLP modules 130 that may be installed on a respective plurality of nodes, e.g., in an organization. For example, if files A, B and C are accessed by application 140 on device 120, files A, B and D are accessed by application 140 when running on one of devices 160 and files A, B and E are accessed by application 140 when running on yet another, different one of devices 160 then a list of files A, B, C, D and E may be associated with application 140. Such list may be distributed by module 181 to some or all modules 130 in system 100. Another example of associating files with an application may relate to a location on a storage device (also known as "path" in the art) of the files. For example, a path such as "C:\Program Files\APPLICATION_140\" may point to the location of files used by application 140. Such path may typically be the same on all devices 120 and 160. Accordingly, all files residing in such location may be associated with application 140 and may be inspected, e.g., in advance, possibly before a first execution of application 140 on a computing device. In some embodiments, even when a location of files related to a specific application is not identical on a number of computing devices, management module 181 may still associate such locations with the application, using templates. For example, a path such as: C:\Documents_and_Settings\%USER%\Local_Settings\ Application_Data\APPLICATION_140\" may be generally similar but differ from one device to another according to the relevant user, e.g., the variable "%USER%" may be substituted with a specific user login name. Module 181 may distribute such path and DLP modules 130 may inspect files at a location pointed to by such path after properly substituting the "%USER%" variable with the relevant user login name. Another parameter that may be distributed may be a reference, path or pointer to an installation folder or directory related to an application. As known in the art, an application typically accesses files in its installation directory or folder, e.g., during startup or during specific operations. Accordingly, files stored in an installation folder may be inspected in advance, e.g., by module 130 upon being provided with a location of files and/or upon being instructed to inspect files therein.

As known in the art, some systems utilize automatic naming of files. For example, log files may be created and renamed on a daily basis. For example, a new log file may be created daily and named log.txt while a previous log file may be renamed to log-DDMMYY.txt where DDMMYY denote the date, month and year when the old or previous log file was renamed or created. In some embodiments, module 181 or module 130 may identify files based on their possibly modified names and may associate files with applications based on a learning or auto-learning algorithm or other knowledge such that even newly created files or files that had their name changed may be properly associated with their respective application.

Renamed, newly created, modified or otherwise manipulated files may be identified and may be treated accordingly. For example, if a specific file was inspected and then renamed, by identifying the new name, e.g., by intercepting the renaming request or based on familiarity with the relevant naming or renaming algorithm, module 130 may determine the newly named file is a known, previously inspected file that may require no inspection. Some embodiments of the invention may determine that the newly named file is a known, previously inspected file by marking or associating it with a metadata field. For example, an associated metadata object may contain a checksum of the file's contents and/or a result of the inspection. A metadata object described herein may be cryptographically authenticated and/or protected from tampering as known in the art. Another example may be a new file in a folder. By identifying the file based on its name, module 130 may determine inspection of the file is not required or is to be performed with low priority, e.g., be associated with a low risk level. For example, observing that application 140 creates a new log file named "app_140.tmp" on a daily basis but never reads such file may cause module 181 to associate such file with a low risk level. Such association may be distributed by module 181 to all modules 130 on system 100. Any auto-generation naming method may be handled by embodiments of the invention, e.g., a sequence number used for naming files, a date and time based naming algorithm or any method may all be identified and properly handled. Any method, technique, objects or algorithm, such as templates, wildcards, regular expressions, or a learning or auto-learning algorithm may be used in order to associate a file with an application even in situations were the file name is automatically generated. Accordingly, rules, criteria, policies or other parameters may be generated by processing reports from a number of DLP modules and may be distributed to a number of DLP modules.

Other methods for identifying files and/or associating files with an application may be used. For example, as known in the art, unlike applications, threads and processes may not be associated with names or meaningful names. Embodiments of the invention may compare or otherwise relate lists of files loaded by a number of threads or processes, and derive a list of files that may be associated with each thread and process. For example, a sequence of loading or accessing files may be recorded and lists may be created based on such sequence. For example, if on one run of the application, a first thread accesses files A, B and C which are associated with the application, and a second thread accesses files D, E and F, which are data files not associated with the application, and on a subsequent run a third thread accesses files A, B and C then it may be determined that this third thread is similar to the first thread and runs tasks associated with the application, whereas another thread that accesses files D, E, and F may be similar to the second thread. In some embodiments, grouping the list of files accessed by threads may be used in identifying the end of the start-up phase of the application. In some embodiments, grouping or categorizing files based on threads accessing them may be used to categorize or identify threads, e.g., based on accessed files, for example, using a learning algorithms.

According to embodiments of the invention, files or other data may be inspected in advance. For example, lists, references or other parameters distributed by DLP management module 181 may be used by a plurality of modules 130 to inspect files and/or folders on a plurality of computing devices 160. Such inspection may be performed by module 130 on a specific device prior to a first time the related application is executed on the specific device. For example, after application 140 was executed on three computing devices included in computing devices 160, all DLP modules 130 on all computing devices 160 may be informed by module 181 of the files accessed by application 140, their location, a relevant rule, criteria or configuration parameter and/or any other related information. Accordingly, a module 130 on a specific computing device included in computing devices 160 may inspect the relevant files before application 140 is executed on such specific computing device for the first time. Accordingly, a startup phase of application 140 on such device may be dramatically shortened since at least some of the files accessed by application 140 may need not be inspected during the startup phase since they were previously inspected.

An inspection of files may be initiated, e.g., by module 181 at any time. For example, upon learning, e.g., from a report of one of modules 130, that a new application was installed on one of devices 160, module 181 may provide all modules 130 in system 100 with relevant information, e.g., application name, location of relevant files etc. Module 181 may instruct modules 130 to commence an inspection of files related to the new application. An inspection as described herein may comprise recording any relevant parameters. For example, a date and/or time of the inspection may be recorded in an inspection parameter or record. Accordingly, upon detecting an attempt to access a previously inspected file, module 130 may check the recorded inspection date and/or time of the file and may further check the file's last modification date and time and/or a cryptographic hash of the file's content generated as described herein. For example, a modification date and time of a file may be obtained from a file system as known in the art. If a recorded inspection date and time is subsequent to the modification date and time and the file hashes are identical, namely, the file was not modified since last inspected, then module 130 may enable the application to access, read or load the file without first inspecting it. In some embodiments of the invention, module 130 may additionally compare a file's last modification date and time with its policy's modification date and time, and enable the application to access, read or load the file only if the policy has not changed since the file was last inspected. Otherwise described, based on a predefined criteria, e.g., the file was not modified since last inspected, an inspection of a file may be skipped, accordingly, time that would otherwise be spent on inspection, e.g., by current DLP systems, may be saved by embodiments of the invention. Accordingly, an application may load and run faster as compared to prior art DLP systems and/or implementations. It will be understood that the method of skipping an inspection of files previously inspected may be applicable to any subsequent runs of an application, not only to a first run described herein.

Below is a general, non limiting description of the permissive mode according to embodiments of the invention. As known in the art, upon activation, an application typically goes through a startup phase. A startup phase typically comprises loading a main executable code section typically followed by reading and/or loading into memory additional files or content. A startup phase as referred to herein may refer to any period of time starting on an activation of an application or program. As stated herein, any function, step or operation described herein may be performed in any of the described modes, it will be understood that modes such as restrictive, permissive or background modes are used as descriptive terms in order to clarify embodiments of the invention. Embodiments of the invention may identify a startup phase of an application and may determine a transition from a startup phase to normal or interactive phase. For example, module 130 may monitor any relevant parameters, indications or events in order to identify a startup phase of an application. For example, a drop-off in file load requests issued by an application may be detected and interpreted as an end of a startup phase or a predefined rate of I/O operations compared to CPU usage may be detected by module 130 and similarly interpreted. For example, by receiving related information from an operating system (OS) or a file system such information may be obtained as known in the art. Another exemplary method of identifying a startup phase may be detecting that the application begins processing OS windowing messages or user input, e.g., receiving and processing mouse and/or keyboard input. In some embodiments of the invention, module 130 may explicitly monitor an application's input processing by sending a windowing message to the application and waiting for the windowing message to be processed, possibly assuming that processing of a windowing message by an application is an indication that the application has completed its start-up phase. In other embodiments, module 130 may identify file access requests to specific files, or file access requests issued by specific threads, as an indication of the end of a startup phase. For example, either by a learning algorithm or based on specific knowledge of an application, module 130 may know which files are accessed by a specific application upon termination of its startup phase, accordingly, a termination of a startup phase may be identified based on files accessed. Any indication that may be related to an end of a startup phase may be used. In some embodiments, upon detecting a startup phase is over, the permissive mode of operation described herein may be replaced by the restrictive mode of operation described herein.

In some embodiments, during a startup phase, embodiments of the invention may defer an inspection of accessed or loaded files. A file for which the inspection was deferred may be loaded into the application with no delay. Otherwise described, an application may be enabled or allowed to read a file without having to wait for the file to be inspected. For example, an application may read the file while the file is being inspected or the file may be inspected after the application already read the file. For example, upon detecting a startup phase of application 140, module 130 may monitor files accessed by application 140 and determine an action. If an accessed file was previously inspected and was not modified since the inspection then module 130 may allow application 140 to read or load the file with no delay as described herein. If the file was modified after it was last inspected then module 130 may still allow or enable application 140 to read and/or load the file but may further place the file or place a reference to the file in an inspection queue further described herein. Accordingly, an increase in performance and/or speed of operation may be due to a number of factors. Firstly, files previously inspected may need not be inspected upon activation of an application, secondly, files for which an inspection may be required may be inspected after or during a startup phase of an application, thus the time in which an application may be ready to assume normal operation, e.g., respond to user input or perform specific tasks may be further shortened. Accordingly, accessing or reading a file by an application may be performed simultaneously, in parallel or concurrently with an inspection of the file or it may be performed prior to an inspection of the file, namely, the file may be inspected after the application already read or loaded the file.

As described herein, a reference to a file for which inspection was delayed or deferred in time may be placed in a prioritized queue and the file may be inspected at a later stage. For example, a separate process, application or even thread, e.g., of module 130 may inspect files according to their place in a queue either while the application is reading the files, before the application reads the files, or after the application already read the files. The queue described herein may be prioritized according to any applicable parameter, criteria, policy or rule. For example, a risk level may be attributed to each file referred to by the queue. For example, a high risk level may be associated with files that were not previously inspected, possibly files not previously seen loaded by the application or otherwise unknown. A lower risk level may be associated with files previously seen loaded by the application but not previously inspected. Another risk level may be associated with files residing in a location were known files, associated with the application are located. Previously inspected but modified since last inspection files may be associated with a risk level that is lower than levels described above. Application components, e.g., executables and libraries in an installation directory or folder or in a known location may be associated with yet lower risk level and files included in a white list may be associated with the lowest risk level, e.g., files which were not modified since last inspected, files specifically indicated as safe, e.g., by a policy or other configuration parameter such as a list of safe to load files provided by module 181. Any action may be performed, triggered or caused upon detecting a security risk in an inspected file, even if such inspection is performed while the file is being read by the application. For example, upon detecting, e.g., based on an inspection, on a command from management module 181 or a policy change that a file already loaded or read by application 140 contains information or parameters that should not be accessible to application 140, application 140 may be prevented by module 130 from continuing its operation (e.g., application 140 may be halted or suspended, or have its file access permissions and other input/output permissions restricted as known in the art), the user and/or an administrator may be alerted and a report may be produced and delivered, e.g., to management module 181.

Figure 2:
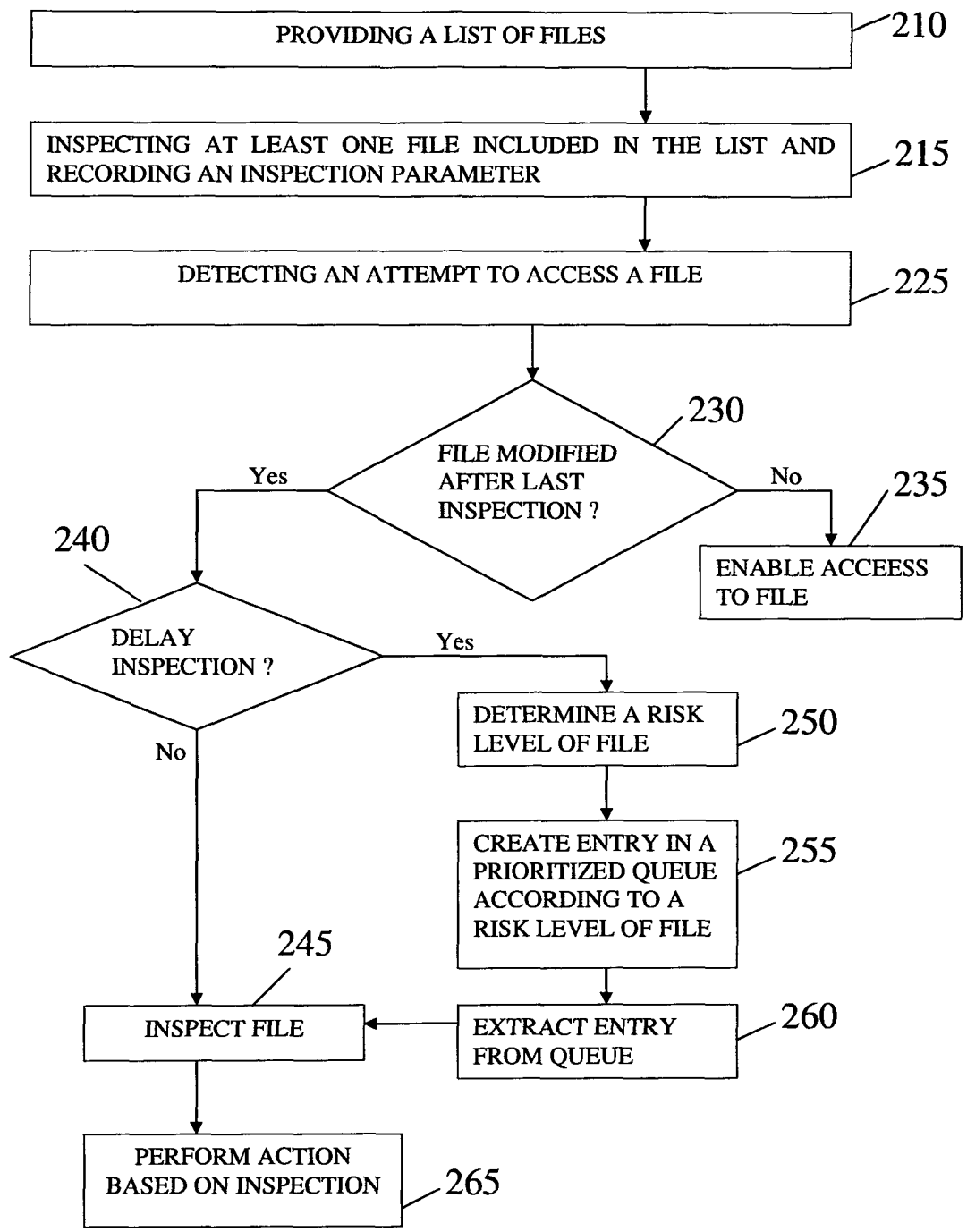
FIG. 2 is a schematic flow chart according to embodiments of the invention.

Reference is made to FIG. 2 that shows a schematic flow chart according to embodiments of the invention. As shown by block 210, the flow may include providing a list of files. For example, a list of files may be provided by a supplier of an application. In some embodiments of the invention, a list of files may be provided by observing and recording files installed by the application's installer package. In other embodiments as described, a list of files may be generated and/or provided by observing and recording files accessed by an application, e.g., per operational phases or modes. As described, a number of lists may be provided to a server, e.g., in a number of reports from a plurality of DLP modules. A list provided as shown by block 210 may be one generated by such server, e.g., by combining or otherwise relating lists in received reports and and/or applying any algorithms or methods to information in received reports. As described, generating a provided list may be according to policies or other configuration parameters and may include any form of processing of any relevant information.

As shown by block 215, the flow may include inspecting at least one file included in the list and recording an inspection parameter or record. As described herein, inspecting files may include any processing required in order to examine data in any relevant content. In a particular embodiment, an inspection may be directed to determining whether sensitive information is included in an inspected object. For example, an inspection may comprise analyzing text in a file in order to assert specific topics are not addressed in the text, analyzing images or drawings in a file or analyzing multimedia content etc. An inspection may be related to metadata or other information related to content. For example, an inspection may comprise identifying or determining the author or creator of the content. For example, in a case where documents created by a specific employee are not to be distributed, as may be dictated by a rule in a policy provided by module 181 to module 130, module 130 may, as part of inspecting the file, examine metadata and determine the identity of the author. Module 130 may prevent an application from accessing a file based on any parameter, e.g., an identity of a creator or a result of an inspection. A result of an inspection may be recorded, e.g., by module 130, in an inspection parameter or record. For example, in cases where an inspection reveals no sensitive information in an inspected object, an appropriate recordation of such inspection result may be performed. For example, a list comprising entries such as inspected files, inspection results and a timestamp of the inspection may be maintained. Such list may be related to a specific application, an application type or a set of applications. Such or other list may be used upon detecting an attempt to access content, e.g., the list may be used in order to determine whether to grant access, prevent access, inspect content prior to enabling/preventing access or inspect content and enable access simultaneously or during overlapping periods of time.

As shown by block 225, the flow may include detecting an attempt to access a file. As described herein, any attempt to access content may be detected by any means. For example, any interaction with a file system, a storage device or any repository of content may be detected, e.g., by an operating system, a special module or driver. According to embodiments of the invention, an inspection may be selective, e.g., embodiments of the invention may select to inspect a content object, delay such inspection, allow the content object to be accessed without inspecting it or select another action. For example, specific files or file types may not be selected for inspection. For example, configuration files identified by their names or other attributes may be known to pose no security threat and accordingly an application may be permitted to read such files without first inspecting them. As described herein, selective inspection may be based on a previous inspection or lack thereof, a modification of the relevant content and time parameters.

As shown by block 230, the flow may include determining if a file was modified after the file was last inspected. For example, an inspection parameter or record updated in relation to an inspection may comprise a date and time of the inspection. By examining a file's modification date and time or the cryptographic hash of file's content and relating such information to the date, time and hash comprised or recorded in the respective inspection parameter or record, module 130 may determine if a file was modified after it was last inspected. As shown by block 235, the flow may include enabling access to a file. For example, based on information in an inspection parameter or record indicating a file on storage 150 was not modified after it was last inspected, module 130 may enable application 140 to access the file without re-inspecting the file.

As shown by block 240, the flow may include determining whether to delay an inspection of a file. For example, in a case where a file was modified after it was last inspected, or a file was never inspected but a current policy requires it to be inspected, embodiments of the invention may select to inspect the file prior to enabling access. For example, if the attempt to access a file as shown in block 225 is made by application 140, DLP module 130 may select to enable application 140 to access the file as shown by block 235, inspect the file prior to enabling application 140 to access the file as shown by block 245 or enable application 140 to access the file and inspect the file at the same or later time as shown by blocks 250, 255, 260 and 245. As described herein, a decision whether to delay an inspection of a file may be according to a mode of operation, e.g., an inspection may be delayed when operating in the permissive mode described herein. As described herein, a decision whether to delay an inspection of a file may be according to a mode, phase or any parameter or aspect related to a relevant application. For example, an inspection may be delayed when the relevant application is operating in a startup phase or mode. Any applicable parameters, input or information may be used to select delaying an inspection as shown in block 240.

As shown by block 245, the flow may include inspecting a file. For example, if it is not selected to delay an inspection of a file, then the file may be inspected with no delay. In such case, an application may be prevented from accessing the file pending on completion of an inspection and/or pending on performing an action, e.g., enabling or blocking access. As shown by block 265, the flow may include performing an action based on the inspection. An exemplary action may be enabling an application to access a file or preventing such access. Other actions may be recording and/or reporting various information, e.g., to a management module.

As shown by block 250, the flow may include determining a risk level of a file. For example, a file may be associated with one of the risk levels described herein. A risk level may be computed or generated as part of a background process, another process or in realtime, e.g., upon detecting an attempt to access the file. A risk level may be associated with a file and may be based on a result of an inspection, e.g., a level of sensitivity of content included in the file, a location of a file, a size of a file, a creator or modifier of a file or any applicable information or parameter that may reflect on security or other aspects. In other embodiments, a risk level may be determined or generated as shown by block 250. In the latter case, a risk level may be generated or calculated in real time, e.g., upon, or in proximity to, creating an entry in a queue as shown by block 255.

As shown by block 255, the flow may include creating an entry in a prioritized queue according to a risk level of file. As known in the art, a prioritized queue may enable extracting entries from the queue based on an associated priority parameter. A priority parameter may a number, for example, a risk level number that may assume the numbers 1 through 100. Accordingly, entries in a queue may be extracted based on their respective risk level, accordingly, files associated with higher risk levels may be inspected first. For example, if more than one file or reference to a file is present in a prioritized queue then the order in which such files are inspected may be according to the respective associated priorities. As shown by block 260, the flow may include extracting an entry from a queue. As described herein, entries may be extracted from a prioritized queue such that files which pose higher risks are inspected before files posing lower security or other risks. For example, application 140 may attempt to access three files during a startup phase. In such case, if according to the flow described herein an inspection of the three files is to be delayed then three entries related to the three files may exist in a prioritized queue. If it was determined as shown in block 250 that the risk level of the first file is 5, the risk level of the second file is 45 and the risk level of the third file is 20 then the second file may be inspected first, the third file may be inspected second and the third file, having the lowest risk level may be inspected last. A delayed inspection may be performed by module 130, a thread related to module 130 or another program or application. Any relevant considerations, e.g., computing power, may influence an implementation of the inspection. Various configurations may be devised in order to enable an application to access data while the data is being inspected as described herein. As shown by the arrow connecting blocks 260 and 245, an entry extracted from a queue may be examined in order to locate the associated file and the associated file may be inspected as described herein. As further shown and described, subsequent to the inspection, an action may be performed.

Reference is made to FIG. 3, showing high level block diagram of an exemplary computing device according to embodiments of the present invention. Computing device 300 may include a controller 305 that may be, for example, a central processing unit processor (CPU), a chip or any suitable computing or computational device, an operating system 315, a memory 320, a storage 30, an input device 335 and an output device 340.

Operating system may be or may include any code segment designed and/or configured to perform tasks involving coordination, scheduling, arbitration, supervising, controlling or otherwise managing operation of computing device 300, for example, scheduling execution of programs. Operating system 315 may be a commercial operating system. Memory 320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units.

Executable code 325 may be any executable code, e.g., an application, a program, a process, task or script. For example, executable code may be or may implement parts of modules 130 and 181 described herein. Executable code 325 may be executed by controller 305 possibly under control of operating system 315. Storage 330 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 150 described herein may be similar to storage 330.

Input devices 335 may be or may include a mouse, a keyboard, a touch screen or pad or any suitable input device. It will be recognized that any suitable number of input devices may be operatively connected to computing device 300 as shown by block 335. Output devices 340 may include one or more displays, speakers and/or any other suitable output devices. It will be recognized that any suitable number of output devices may be operatively connected to computing device 300 as shown by block 340. Any applicable input/output (I/O) devices may be connected to computing device 300 as shown by blocks 335 and 340. For example, a network interface card (NIC), a printer or facsimile machine, a universal serial bus (USB) device or external hard drive may be included in input devices 335 and/or output devices 340. According to embodiments of the invention, computing devices 120, 160 and 180 may comprise all or some of the components comprised in computing device 300 as shown and described herein.

Embodiments of the invention may include an article or apparatus such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. For example, a storage medium such as memory 320, computer-executable instructions such as executable code 325 and a controller such as controller 305. Some embodiments may be provided in a computer program product that may include a machine-readable medium, stored thereon instructions, which may be used to program a computer, or other programmable devices, to perform methods as disclosed above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of enabling efficient inspection of content by Data Leakage Prevention (DLP) application, the method comprising:
providing a list of content objects previously accessed by said application;
performing Data Leakage Prevention (DLP) inspection of a content object included in said list, wherein said DLP inspection comprises inspecting said content object by a Data Leakage Prevention (DLP) module to detect possible data leakage, and recording a Data Leakage Prevention (DLP) inspection parameter associated with said content object and related to said DLP inspecting of said content object,
wherein the DLP inspection parameter is a time of most-recent DLP inspection of said content object;
in response to an attempt made by said application to access a content object included in said list, determining whether or not content of the content object was modified after said content object was last inspected by said DLP module by examining the DLP inspection parameter associated with said content object;
if the content of the content object was not modified after its most-recent DLP inspection as determined based on the DLP inspection parameter of said content object, then enabling said application to efficiently access the content object without re-performing DLP inspection of said content object for Data Leakage Prevention (DLP);
if the content of the content object was modified after its most-recent DLP inspection as determined based on the DLP inspection parameter of said content object, then performing a fresh Data Leakage Prevention (DLP) inspection of said content object; and performing an action based on results of said fresh DLP inspection of said content object.

2. The method of claim 1, wherein said action is at least one of: inspecting said content object, preventing said application from accessing said content object, changing a permission parameter of said application, halting said application, suspending said application, modifying said content object, modifying an access permission parameter related to said content object and modifying a metadata object related to said content object.

3. An article comprising a NON TRANSITORY computer-readable medium, having stored thereon instructions, that when executed on a computer, cause the computer to perform a method of efficient inspection of content by a Data Leakage Prevention (DLP) application, the method comprising:
providing a list of content objects previously accessed by said application;
performing Data Leakage Prevention (DLP) inspection of a content object included in said list, wherein said DLP inspection comprises inspecting said content object by a Data Leakage Prevention (DLP) module to detect possible data leakage, and recording a Data Leakage Prevention (DLP) inspection parameter associated with said content object and related to said DLP inspecting of said content object,
wherein the DLP inspection parameter is a time of most-recent DLP inspection of said content object;
in response to an attempt made by said application to access a content object included in said list, determining whether or not content of the content object was modified after said content object was last inspected by said DLP module by examining the DLP inspection parameter associated with said content object;
if the content of the content object was not modified after its most-recent DLP inspection as determined based on the DLP inspection parameter of said content object, then enabling said application to efficiently access the content object without re-performing DLP inspection of said content object for Data Leakage Prevention (DLP);
if the content of the content object was modified after its most-recent DLP inspection as determined based on the DLP inspection parameter of said content object, then performing a fresh Data Leakage Prevention (DLP) inspection of said content object; and performing an action based on results of said fresh DLP inspection of said content object.

4. The method of claim 1, comprising:
(a) intercepting a request by said application, to rename a content object that was already DLP-inspected by said DLP module;
(b) subsequently, upon access of said application to said content object, determining by said DLP module that performing DLP re-inspection is non-required based on determination that a currently-accessed content object is a previously-renamed previously-DLP-inspected content object.

5. The method of claim 1, comprising:
(a) detecting by said DLP module, that said application creates a new file at a pre-defined time interval, and further detecting that said new file is not subsequently read by said application;
(b) subsequently, determining by said DLP module that performing DLP inspection of said file is non-required based on the detecting operations of step (a).

6. The method of claim 1, wherein said DLP inspection parameter is created by a first DLP module residing on a first computing device, and wherein said DLP inspection parameter is transferred from to a server-side DLP management module which in turn distributes said DLP inspection parameter to at least a second DLP module residing on a second, different, computing device.

7. The method of claim 1, wherein said DLP inspection parameter is created by a first DLP module residing on a first computing device, and wherein said DLP inspection parameter is transferred from to a server-side DLP management module which in turn distributes to at least a second DLP module residing on a second, different, computing device: (I) said DLP inspection parameter, and (II) rules of a DLP inspection policy to be applied.

8. The method of claim 1, further comprising:
classifying said application, by said DLP inspection module, into exactly one category out of: (I) a trusted application which cannot cause data leakage; or (II) a controlled application which can cause data leakage but can be configured to avoid data leakage; or (III) an untrusted application which can cause data leakage and cannot be configured to avoid data leakage;
based on said classifying, automatically determining whether to authorize or un-authorize access of said application to said content item without re-performing DLP inspection.

9. The method of claim 1, further comprising:
classifying said application, by said DLP inspection module, into exactly one category out of: (I) a trusted application which cannot cause data leakage; or (II) a controlled application which can cause data leakage but can be configured to avoid data leakage; or (III) an untrusted application which can cause data leakage and cannot be configured to avoid data leakage;
based on said classifying, automatically determining whether to authorize or un-authorize access of said application to said content item without re-performing DLP inspection;
dynamically modifying a classification of an application, from untrusted application to controlled application, upon installation of a plug-in that enables the DLP inspection module to control propagation of sensitive data through said application.

10. The method of claim 1, further comprising:
dynamically determining by said DLP inspection module, to operate either in permissive mode or in restrictive mode,
wherein in restrictive mode said DLP inspection module performs DLP inspection of at least one content object that is not inspected in permissive mode.

11. The method of claim 1, further comprising:
dynamically determining by said DLP inspection module, to operate either in permissive mode or in restrictive mode,
wherein in restrictive mode said DLP inspection module performs DLP inspection of at least one content object that is not inspected in permissive mode;
wherein the method comprises: determining by said DLP inspection module to operate in permissive mode in relation to a particular application that is known to be able to read and disseminate data only in response to a user instruction.

12. The method of claim 1, further comprising:
dynamically determining by said DLP inspection module, to operate either in permissive mode or in restrictive mode,
wherein in restrictive mode said DLP inspection module performs DLP inspection of at least one content object that is not inspected in permissive mode;
wherein the method comprises: determining by said DLP inspection module to operate in permissive mode in relation to a particular application that is known to be non-disseminating data during a startup phase of said application in which files are being loaded by said application.

13. The method of claim 1, further comprising:
performing DLP-inspection of a new application, by a first DLP module residing on a first computing device, upon installation of said new application;
transferring from the first DLP module residing on the first computing device, an indicator that DLP-inspection was performed on said new application, to a second DLP module residing on a second computing device;
based on said indicator received by the second DLP module residing at the second computing device, performing a shortened start-up phase of said new application on said second computing device.

14. The method of claim 1, further comprising:
(a) determining that said content item was not modified since its most-recent DLP-inspection;
(b) further determining that a DLP inspection policy, that applies to said application, was modified since said most-recent DLP inspection of said content item;
(c) based on the determining operations of steps (a) and (b) together, determining to re-perform DLP inspection of said content item even though said content item was not modified since its most-recent DLP inspection.

15. The method of claim 1, further comprising:
dynamically determining by said DLP inspection module, to operate either in permissive mode or in restrictive mode with relation to a particular application,
wherein in restrictive mode said DLP inspection module performs DLP inspection of at least one content object that is not inspected in permissive mode;
wherein the method comprises:
determining by said DLP inspection module to operate in permissive mode in relation to said particular application during a startup phase of said particular application, and determining by said DLP inspection module to operate in restrictive mode in relation to said particular application upon completion of the startup phase of said particular application.

16. The method of claim 1, further comprising:
dynamically determining by said DLP inspection module, to operate either in permissive mode or in restrictive mode with relation to a particular application,
wherein in restrictive mode said DLP inspection module performs DLP inspection of at least one content object that is not inspected in permissive mode;
wherein the method comprises:
determining by said DLP inspection module to operate in permissive mode in relation to said particular application during a startup phase of said particular application, and determining by said DLP inspection module to operate in restrictive mode in relation to said particular application upon completion of the startup phase of said particular application;
wherein the method comprises: dynamically determining that said particular application has completed its startup phase, based on monitoring a rate of input/output operations of said particular application and based on Central Processing Unit (CPU) usage of said particular application.

17. The method of claim 1, further comprising:
dynamically determining by said DLP inspection module, to operate either in permissive mode or in restrictive mode with relation to a particular application, wherein in restrictive mode said DLP inspection module performs DLP inspection of at least one content object that is not inspected in permissive mode;

wherein the method comprises:

determining by said DLP inspection module to operate in permissive mode in relation to said particular application during a startup phase of said particular application, and determining by said DLP inspection module to operate in restrictive mode in relation to said particular application upon completion of the startup phase of said particular application;

wherein the method comprises: dynamically determining that said particular application has completed its startup phase, by (I) sending to said particular application an Operating System windowing message, and (II) detecting that said particular application is processing said Operating System windowing message.

18. The method of claim 1, further comprising:

postponing DLP-inspection of a file, that is loaded and read during a startup phase of a particular application, to be DLP-inspected after completion of said startup phase of said particular application;

wherein said postponing of the DLP-inspection of the file comprises: (I) authorizing said particular application to load and read said file during the startup phase of said application without performing prior DLP-inspection of said file; and (II) performing DLP-inspection of said file after completion of said startup phase of said particular application.

19. The method of claim 1, further comprising:

postponing DLP-inspection of multiple files, that are loaded and read during a startup phase of a particular application, to be DLP-inspected in a particular DLP-inspection order after completion of said startup phase of said particular application;

wherein said postponing of the DLP-inspection of said multiple files comprises: (I) authorizing said particular application to load and read said multiple files during the startup phase of said application without performing prior DLP-inspection of said multiple files; and (II) creating a DLP-inspection queue, in which said multiple files are ordered based on their respective risk level as estimated by said DLP module; and (III) performing DLP-inspection of said multiple files, after completion of said startup phase of said particular application, based on their order in said DLP-inspection queue.

20. The method of claim 1, further comprising:

postponing DLP-inspection of multiple files, that are loaded and read during a startup phase of a particular application, to be DLP-inspected in a particular DLP-inspection order after completion of said startup phase of said particular application;

wherein said postponing of the DLP-inspection of said multiple files comprises: (I) authorizing said particular application to load and read said multiple files during the startup phase of said application without performing prior DLP-inspection of said multiple files; and (II) creating a DLP-inspection queue, in which said multiple files are ordered based on their respective risk level as estimated by said DLP module; and (III) performing DLP-inspection of said multiple files, after completion of said startup phase of said particular application, based on their order in said DLP-inspection queue;

wherein entries in said DLP-inspection queue are ordered by taking into account at least one of: (i) size of the file to be DLP-inspected, (ii) location of the file to be DLP-inspected, (iii) identity of a user that created the file to be DLP-inspected.

* * * * *